United States Patent
Yun et al.

(10) Patent No.: US 10,764,210 B2
(45) Date of Patent: Sep. 1, 2020

(54) OPERATION METHOD OF COMMUNICATION NODE FOR MIRRORING IN VEHICLE NETWORK

(71) Applicants: HYUNDAI MOTOR COMPANY, Seoul (KR); KIA MOTORS CORPORATION, Seoul (KR)

(72) Inventors: Jin Hwa Yun, Seoul (KR); Jeong Seok Han, Suwon-si (KR); Kang Woon Seo, Seoul (KR); Dong Ok Kim, Goyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 235 days.

(21) Appl. No.: 15/722,945

(22) Filed: Oct. 2, 2017

(65) Prior Publication Data

US 2018/0102987 A1    Apr. 12, 2018

(30) Foreign Application Priority Data

Oct. 7, 2016   (KR) .................. 10-2016-0130032
Jul. 27, 2017  (KR) .................. 10-2017-0095325

(51) Int. Cl.
*H04L 12/931*    (2013.01)
*H04L 29/08*     (2006.01)

(52) U.S. Cl.
CPC ......... *H04L 49/208* (2013.01); *H04L 67/12* (2013.01)

(58) Field of Classification Search
CPC .................. H04L 49/208; H04L 67/12
USPC .................................. 370/254, 223
See application file for complete search history.

(56) References Cited

U.S. PATENT DOCUMENTS

| | | | |
|---|---|---|---|
| 2015/0071115 A1* | 3/2015 | Neff | H04L 12/40 370/254 |
| 2015/0228130 A1* | 8/2015 | Zinner | H04L 43/04 701/29.1 |
| 2016/0065409 A1* | 3/2016 | Kim | H04L 12/12 709/223 |
| 2017/0034065 A1* | 2/2017 | Iwakura | H04L 47/32 |

* cited by examiner

*Primary Examiner* — Kwang B Yao
*Assistant Examiner* — Syed M Bokhari
(74) *Attorney, Agent, or Firm* — Morgan, Lewis & Bockius LLP

(57) ABSTRACT

An operation method of a first communication node among a plurality of communication nodes included in an Ethernet-based vehicle network includes: receiving a first message indicating an operation of a first function of a vehicle from a second communication node among the plurality of communication nodes; determining a third communication node performing a second function corresponding to the first function among the plurality of communication nodes; determining at least one communication node providing data related to the second function among the plurality of communication nodes; and configuring port mirroring for the first function such that a second message received from the at least one communication node is mirrored to the third communication node.

14 Claims, 7 Drawing Sheets

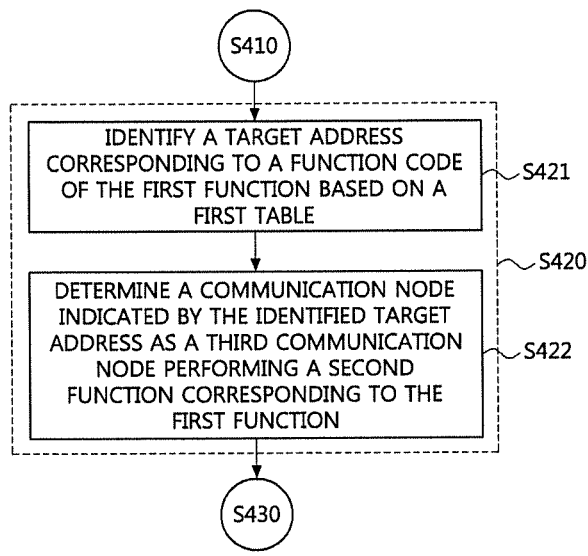
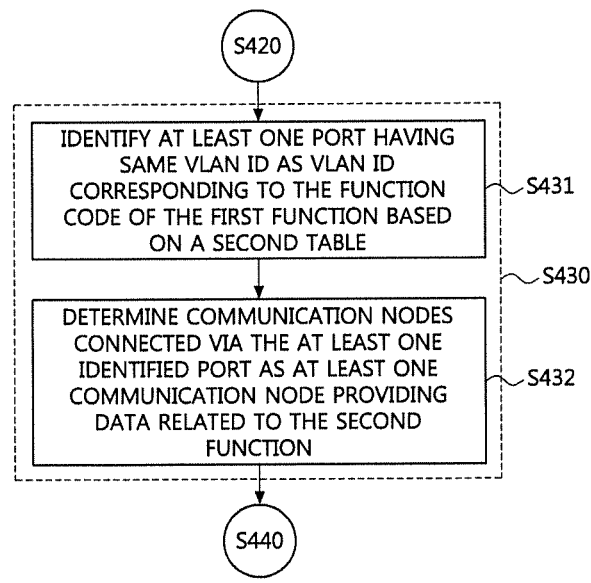

OPERATION METHOD OF COMMUNICATION NODE FOR MIRRORING IN VEHICLE NETWORK

CROSS-REFERENCE TO RELATED APPLICATIONS

This application is based on and claims the benefit of priority to Korean Patent Applications No. 10-2016-0130032 filed on Oct. 7, 2016 and No. 10-2017-0095325 filed on Jul. 27, 2017 in the Korean Intellectual Property Office (KIPO), the entirety of which is incorporated by reference as if fully set forth herein.

TECHNICAL FIELD

The present disclosure relates to an operation method of a communication node for a switch mirroring, and more specifically, to an operation method of a communication node for implementing a vehicle electronic system through a mirroring function of an Ethernet switch in an Ethernet-based vehicle network.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, like most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

Specifically, the Ethernet-based vehicle network may implement a vehicle electronic system through at least one switch enabling Ethernet-based communication. For example, the switch may be used for implementing the vehicle electronic system as performing functions of processing data received via electronic devices included in the vehicle network and transmitting the processed data to electronic devices capable of outputting the processed data. However, recently, the number of electronic devices included in the vehicle network has increased, and accordingly, data to be processed has increased, so that it is becoming difficult to realize an efficient electric vehicle system.

SUMMARY

The present disclosure provides an operation method of a communication node for implementing a vehicle electronic system through a mirroring function of an Ethernet switch in an Ethernet-based vehicle network.

In accordance with embodiments of the present disclosure, an operation method of a first communication node among a plurality of communication nodes included in an Ethernet-based vehicle network may comprise receiving a first message indicating an operation of a first function of a vehicle from a second communication node among the plurality of communication nodes; determining a third communication node performing a second function corresponding to the first function among the plurality of communication nodes; determining at least one communication node providing data related to the second function among the plurality of communication nodes; and configuring port mirroring for the first function such that a second message received from the at least one communication node is mirrored to the third communication node.

The third communication node may be determined based on a first table including function codes of a plurality of functions performed at the vehicle, target addresses corresponding to the respective function codes, and virtual local area network (VLAN) identifiers corresponding to the respective function codes.

The determining a third communication node may further comprise identifying a target address corresponding to a function code of the first function based on the first table; and determining a communication node indicated by the identified target address as the third communication node performing the second function corresponding to the first function.

The at least one communication node may be determined based on a second table including port numbers of a plurality of ports included in the first communication node, media access control (MAC) addresses of communication nodes connected through the plurality of ports, and VLAN identifiers of the communication nodes connected through the plurality of ports.

The determining at least one communication node may further comprise identifying at least one port having a VLAN identifier identical to a VLAN identifier corresponding to the function code of the first function based on the second table; and determining at least communication node connected through the identified at least one port as the at least one communication node providing data related to the second function.

The configuring port mirroring may further comprise configuring a port connecting between the first communication node and the third communication node as a target port of mirroring for the first function; and configuring at least one port connecting the first communication node and the at least one communication node as at least one mirroring port of mirroring for the first function.

The operation method may further comprise transmitting a second message to the third communication node through the target port when the second message is received from the at least one communication node through the at least one mirroring port.

The first communication node may be a switch included in the Ethernet-based vehicle network, and the second communication node, the third communication node, and the at least one communication node may be end nodes connected to the first communication node.

Further, in accordance with embodiments of the present disclosure, an operation method of a first communication node among a plurality of communication nodes included in an Ethernet-based vehicle network may comprise receiving a message including data related to a function of a vehicle from at least communication node among the plurality of communication nodes; determining whether or not port mirroring is configured for the function; and processing the message based on whether the port mirroring is configured for the function.

The port mirroring may be determined as being configured for the function when at least one port connecting the first communication node and the at least one communication node is a mirroring port of mirroring for the function.

The port mirroring may be determined as not being configured for the function when at least one port connecting the first communication node and the at least one communication node is not a mirroring port of mirroring for the function.

In the processing of the message, the message may be transmitted to a third communication node connected through a target port of mirroring for the function when the port mirroring is configured for the function.

In the processing of the message, the message may be deleted when the port mirroring is not configured for the function.

The first communication node may be a switch included in the Ethernet-based vehicle network, and the second communication node and the at least one communication node may be end nodes connected to the first communication node.

Further, in accordance with embodiments of the present disclosure, a first communication node in an Ethernet-based vehicle network may comprise a processor and a memory storing at least one instruction executed by the processor. Also, the at least one instruction may be configured to receive a first message indicating an operation of a first function of a vehicle from a second communication node among a plurality of communication nodes; determine a third communication node performing a second function corresponding to the first function among the plurality of communication nodes; determine at least one communication node providing data related to the second function among the plurality of communication nodes; configure port mirroring for the first function such that a second message received from the at least one communication node is mirrored to the third communication node; and upon receiving the second message from the at least one communication node, transmit the second message to the third communication node based on the configured port mirroring.

The at least one instruction may be further configured to determine the third communication node based on a first table including function codes of a plurality of functions performed at the vehicle, target addresses corresponding to the respective function codes, and virtual local area network (VLAN) identifiers corresponding to the respective function codes.

The at least one instruction may be further configured to identify a target address corresponding to a function code of the first function based on the first table, and determine a communication node indicated by the identified target address as the third communication node performing the second function corresponding to the first function.

The at least one instruction may be further configured to determine the at least one communication node based on a second table including port numbers of a plurality of ports included in the first communication node, media access control (MAC) addresses of communication nodes connected through the plurality of ports, and VLAN identifiers of the communication nodes connected through the plurality of ports.

The at least one instruction may be further configured to identify at least one port having a VLAN identifier identical to a VLAN identifier corresponding to the function code of the first function based on the second table, and determine at least communication node connected through the identified at least one port as the at least one communication node providing data related to the second function.

The at least one instruction may be further configured to configure a port connecting between the first communication node and the third communication node as a target port of mirroring for the first function, and configure at least one port connecting the first communication node and the at least one communication node as at least one mirroring port of mirroring for the first function.

According to the embodiments of the present disclosure, the time required for processing data in a vehicle network can be reduced, thereby improving the efficiency for implementation of an electronic system of a vehicle. Also, an operation method of a communication node according to the present disclosure has the effect of processing data received through a communication method other than the Ethernet-based communication method without processing by a separate gateway.

BRIEF DESCRIPTION OF DRAWINGS

Embodiments of the present disclosure will become more apparent by describing in detail forms of the present disclosure with reference to the accompanying drawings, in which:

FIG. 5 is a flow chart for explaining a method for determining a third communication node in the operation method shown in FIG. 4;

FIG. 6 is a flow chart for explaining a method for determining at least one communication node in the operation method shown in FIG. 4;

Figure 1:
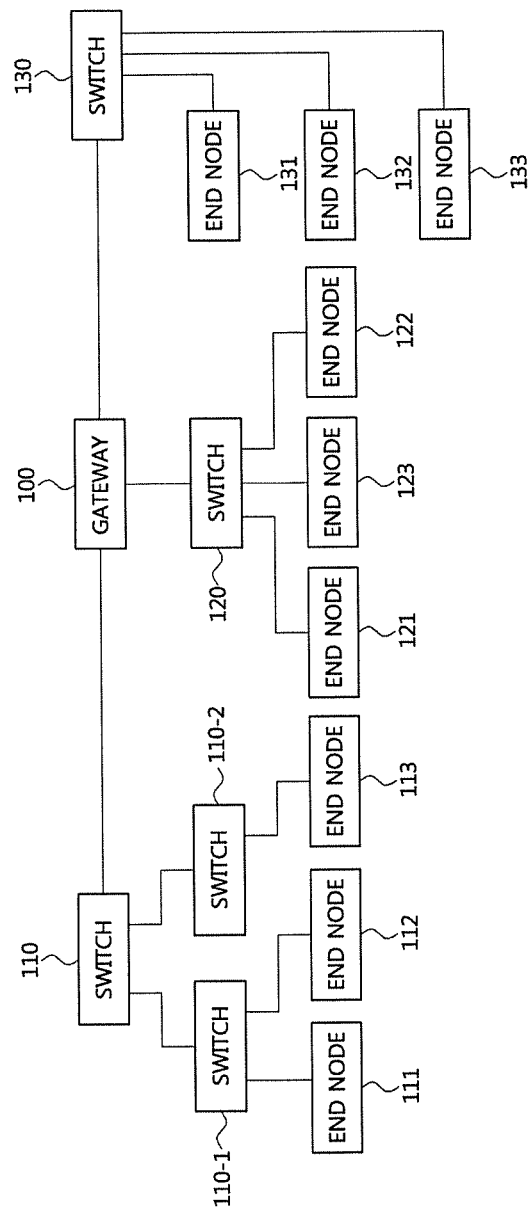
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
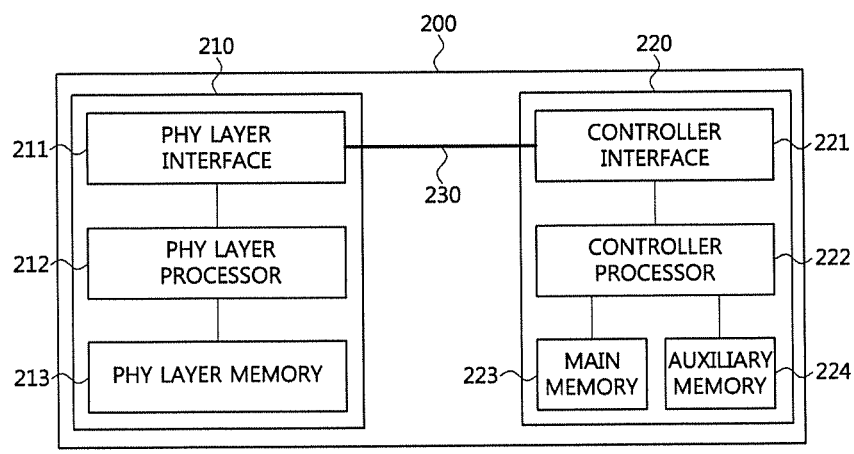
FIG. 2 is a block diagram illustrating a first embodiment of a communication node belonging to a vehicle network.

FIG. 2 is a block diagram illustrating a first embodiment of a communication node belonging to a vehicle network.

Referring to FIG. 2, a communication node 200 constituting a vehicle network may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

In the following description, a method performed at a communication node belonging to a vehicle network and a corresponding counterpart communication node will be described. Hereinafter, even when a method (e.g., transmission or reception of a signal) to be performed at a first communication node is described, a counterpart second communication node corresponding to the first communication node may perform a method (e.g., reception or transmission of the signal) corresponding to the method performed at the first communication node. That is, when the operation of the first communication node is described, the corresponding second communication node can perform a counterpart operation corresponding to the operation of the first communication node. Conversely, when the operation of the second communication node is described, the corresponding first communication node can perform a counterpart operation corresponding to the operation of the second communication node.

Figure 3:
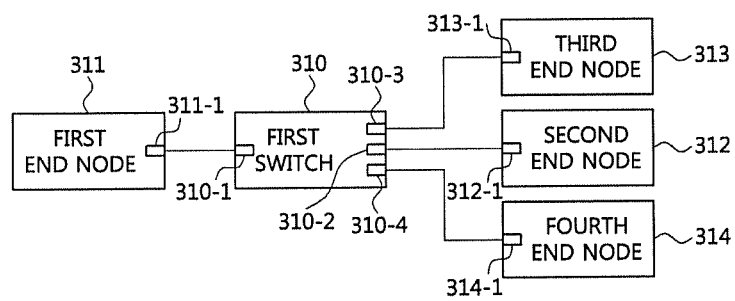
FIG. 3 is a block diagram for explaining an operation method of a communication node for mirroring in a vehicle network according to an embodiment of the present disclosure.

FIG. 3 is a block diagram for explaining an operation method of a communication node for mirroring in a vehicle network according to an embodiment of the present disclosure.

Referring to FIG. 3, a vehicle network may comprise a first switch 310, a first end node 311, a second end node 312, a third end node 313, and a fourth end node 314, and the like. The first switch 310 may perform the same or similar functions as the switch shown in FIG. 1 and the end nodes 311, 312, 313, and 314 may perform the same or similar functions as the end node illustrated in FIG. 1. The first switch 310 and end nodes 311, 312, 313, and 314, respectively, may be configured the same or similar to the communication node shown in FIG. 2.

The first switch 310 may include a plurality of ports 310-1, 310-2, 310-3, and 310-4. The first port 310-1 of the switch 310 may be connected to a first port 311-1 of the first end node 311, and a link may be formed between the first port 310-1 of the first switch 310 and the first port 311-1 of the first end node 311. The second port 310-2 of the first switch 310 may be connected to a first port 312-1 of the second end node 312, and a link may be formed between the second port 310-2 of the first switch 310 and the first port 312-1 of the second end node 312. The third port 310-3 of the first switch 310 may be connected to a first port 313-1 of the third end node 313, and a link may be formed between the third port 310-3 of the first switch 310 and the first port 313-1 of the third end node 313. The fourth port 310-4 of the first switch 310 may be connected to a first port 314-1 of the fourth end node 314, and a link may be formed between the fourth port 310-4 of the first switch 310 and the first port 314-1 of the fourth end node 314. Hereinafter, an operation method of a communication node described with reference to FIG. 3 will be described in detail with reference to FIGS. 4 to 7.

Figure 4:
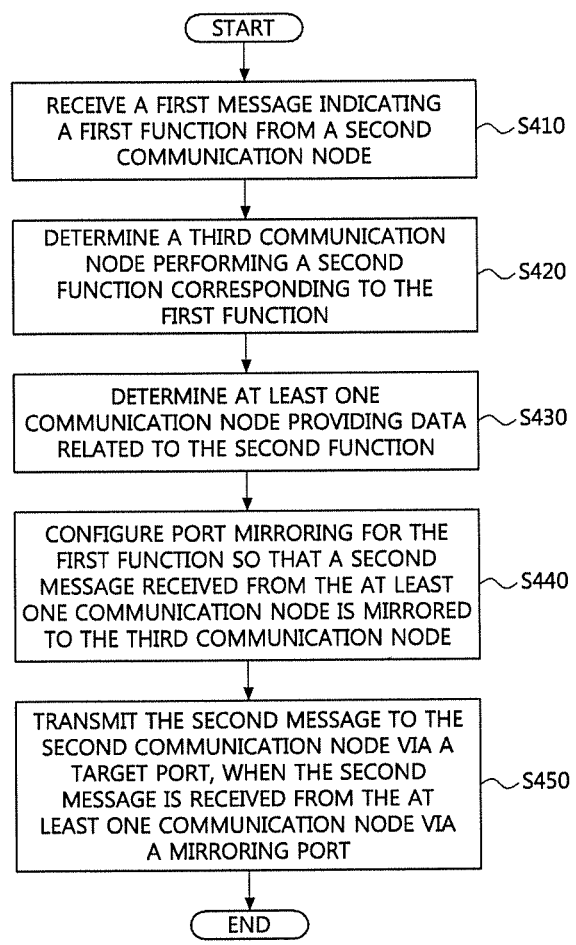
FIG. 4 is a flowchart for explaining an operation method of a communication node for mirroring in a vehicle network according to an embodiment of the present disclosure.

FIG. 4 is a flowchart for explaining an operation method of a communication node for mirroring in a vehicle network according to an embodiment of the present disclosure.

Referring to FIG. 4, an operation method of a communication node for mirroring in a vehicle network according to an embodiment of the present disclosure may be performed in a first communication node. The first communication node may refer to the first switch 310 described with reference to FIGS. 1 and 3, and may have a structure similar or identical to that of the communication node described with reference to FIG. 2. A vehicle network according to an embodiment of the present disclosure may include a plurality of communication nodes. Here, the plurality of communication nodes included in the vehicle network may include the end nodes 311, 312, 313, and 314 connected to the first switch 310 and the first switch 310 described with reference to FIG. 3.

A second communication node among the plurality of communication nodes included in the vehicle network may refer to the first end node 311 connected to the first communication node (i.e., the switch 310). For example, the second communication node may refer to an ECU performing a first function that is one of a plurality of functions performed at the vehicle (such as control of gear, speed and direction, etc.).

In the case that the second communication node performs the operation of the first function of the vehicle, the second communication node may generate a first message including an indicator indicating the operation of the first function. Then, the second communication node may transmit the first message to the first communication node. Then, the first communication node may receive the first message from the second communication node (S410). Then, the first communication node may identify the indicator indicating the operation of the first function included in the first message, and may recognize that the first function is operated in the vehicle through the identified indicator.

Then, the first communication node may determine a third communication node that performs a second function corresponding to the first function among the plurality of communication nodes (S420). Here, the second function corresponding to the first function may mean a function related to the first function among a plurality of functions performed at the vehicle. For example, if the second communication node is a transmission of the vehicle and the first function is a function of shifting a gear of the vehicle into a reverse position (i.e., 'R' position), the second function may be a function of outputting images photographed at the rear of the vehicle. That is, the third communication node performing the second function may be a display device capable of outputting images photographed at the rear of the vehicle. As another example, if the second communication node is a steering device for controlling the direction of the vehicle and the first function is a function of controlling the direction of the vehicle to the left or right, the second function may be a function of outputting images photographed on the left or right side of the vehicle. That is, the third communication node performing the second function may be a display device capable of outputting images photographed on the left side or the right side of the vehicle.

The first communication node may determine the third communication node based on a first table including function codes for respective functions performed at the vehicle, target addresses corresponding to the respective function codes, and virtual LAN (VLAN) identifiers (IDs) for the respective function codes. A specific method of determining the third communication node at the first communication node may be described below with reference to FIG. 5.

FIG. 5 is a flow chart for explaining a method for determining a third communication node in the operation method shown in FIG. 4.

Referring to FIG. 5, the first communication node performing an operation method of a communication node for mirroring in a vehicle network according to an embodiment of the present disclosure may determine the third communication node performing the second function corresponding to the first function based on information included in a first table. The first table for determining the third communication node at the first communication node may be represented as shown in Table 1 below.

TABLE 1

| Function code | Description | Target address | VLAN_ID |
|---|---|---|---|
| 1 | Diagnostic | FF-FF-FF-FF-FF-FF | 1 |
| 2 | Surround view | 01-10-A0-C0-00-02 | 2 |
| 3 | Rear view | 01-10-A0-C0-00-06 | 3 |
| ... | ... | ... | ... |

Table 1 above may refer to an embodiment of the first table that is referenced to determine the third communication node that performs the second function corresponding to the first function at the first communication node. Table 1 may include function codes for a plurality of functions performed at the vehicle, descriptions of the function codes, target addresses corresponding to the function codes, and VLAN IDs corresponding to the function codes. The first communication node may identify the function code of the first function based on the first table. For example, when the first function is a function of shifting a gear of the vehicle into a driving position (i.e., 'D' position) or a reverse position (i.e., 'R' position), it may be determined that a function related to a surround view, which is a function for photographing forward direction or backward direction of the vehicle, is required. Accordingly, the first communication node may determine the function code of the first function as '2' corresponding to the surround view by referring to the table.

Then, the first communication node may identify a target address corresponding to the function code of the first function in the table (S421). For example, the first communication node may identify the target address corresponding to the function code '2' as '01-10-AO-CO-00-02'. Thereafter, the first communication node may determine that the communication node designated by the identified target address is the third communication node that performs the second function corresponding to the first function (S422). That is, the first communication node may identify the communication node indicated by the target address '01-10-A0-C0-00-02' as the third communication node that performs the second function corresponding to the first function.

Referring again to FIG. 4, the first communication node may determine at least one communication node providing data related to the second function among the plurality of communication nodes (S430). For example, when the first function is a function of shifting a gear of the vehicle into a reverse position (i.e., 'R' position) and the second function is a function of outputting images photographed at the rear of the vehicle, the at least one communication providing the data related to the second function may be a camera capable of photographing backward direction of the vehicle. As another example, when the function is a function of controlling the direction of the vehicle to the left or right and the second function is a function of outputting images photographed on the left or right side of the vehicle, the at least one communication providing the data related to the second function may be at least one camera capable of photographing the left or right side of the vehicle.

Specifically, the first communication node may determine the at least one communication based on a second table including port numbers of a plurality of ports included in the first communication node, MAC addresses of communication nodes connected through the plurality of ports, and VLAN IDs of the communication nodes connected through the plurality of ports. A specific method of determining the at least one communication node at the first communication node will be described below with reference to FIG. 6.

FIG. 6 is a flow chart for explaining a method for determining at least one communication node in the operation method shown in FIG. 4.

Referring to FIG. 6, the first communication node performing an operation method of a communication node for mirroring in a vehicle network according to an embodiment of the present disclosure may determine at least communication node providing data related to the second function based on information included in a second table. The second table for determining the at least one communication node at the first communication node may be represented as shown in Table 2 below.

TABLE 2

| Port number | MAC address | VLAN_ID |
|---|---|---|
| 1 | 01-10-A0-C0-00-01 | 1 |
| 2 | 01-10-A0-C0-00-02 | 2 |
| 3 | 01-10-A0-C0-00-03 | 2 |

TABLE 2-continued

| Port number | MAC address | VLAN_ID |
|---|---|---|
| 4 | 01-10-A0-C0-00-04 | 2 |
| 5 | 01-10-A0-C0-00-05 | 3 |
| ... | ... | ... |

Table 2 above may refer to an embodiment of the second table that is referenced to determine the at least one communication node providing data related to the second function at the first communication node. For example, the second table may include port numbers of a plurality of ports included in the first communication node, MAC addresses of communication nodes connected through the plurality of ports, VLAN IDs of the communication nodes connected through the plurality of ports, and the like. The first communication node may identify at least one port having the same VLAN ID as the VLAN ID corresponding to the function code of the first function in the second table (S431). Specifically, the first communication node may identify that the VLAN ID corresponding to the function code '2' is '2' based on the first table. Thereafter, the first communication node may identify that the ports having the port numbers 2, 3, and 4 in the second table are the ports having the VLAN ID '2'.

Thereafter, the first communication node may determine at least one communication node connected though the identified ports as the at least one communication node providing data related to the second function (S432). Specifically, the first communication node may identify the MAC addresses of the communication nodes connected through the ports having the port numbers 2, 3, and 4. Then, the first communication node may identify at least one communication node having MAC addresses other than the MAC address corresponding to the target address among the MAC addresses of the ports having the port numbers 2, 3, and 4. Then, the first communication node may determine the at least one communication node having MAC addresses other than the MAC address corresponding to the target address as the at least one communication providing data related to the second function.

For example, the first communication node may identify that the MAC address ('01-10-A0-C0-00-02') of the port having the port number 2 is the MAC address corresponding to the target address among the MAC addresses ('01-10-A0-C0-00-02', '01-10-A0-C0-00-03', and '01-10-A0-C0-00-04') of the ports having the port numbers 2, 3, and 4. Then, the first communication node may determine the communication nodes having the MAC addresses ('01-10-A0-C0-00-03' and '01-10-A0-C0-00-04') excluding the MAC address ('01-10-A0-C0-00-02') corresponding to the target address as the at least one communication node providing data related to the second function.

Referring again to FIG. 4, the first communication node may configure port mirroring for the first function such that a second message received from the at least one communication node is mirrored to the third communication node (S440). A specific method of configuring port mirroring for the first function at the first communication node will be described below with reference to FIG. 7.

Figure 7:
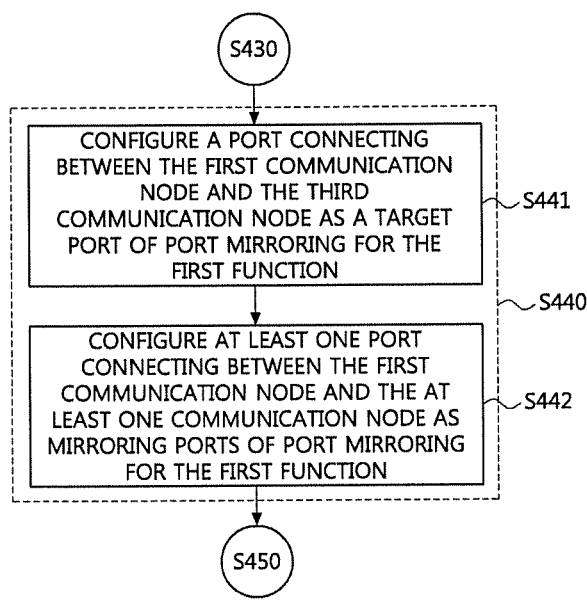
FIG. 7 is a flow chart for explaining a method for configuring port mirroring in the operation method shown in FIG. 4.

FIG. 7 is a flow chart for explaining a method for configuring port mirroring in the operation method shown in FIG. 4.

Referring to FIG. 7, the first communication node performing an operation method of a communication node for mirroring in a vehicle network according to an embodiment of the present disclosure may configure a port connecting between the first communication node and the third communication node as a target port of mirroring for first function (S441). Specifically, the first communication node may identify the MAC address of the third communication node, which is determined based on the first table, in the second table, and identify the port corresponding to the MAC address of the third communication node. Then, the first communication node may identify a port connecting between the first communication node and the third communication node among the plurality of ports included in the first communication node, and configure the identified port as the target port of mirroring for the first function.

For example, if the first communication node is the first switch 310 shown in FIG. 3, the third communication node may be the second end node 312 connected to the first switch 310. In this case, the first switch 310 may identify a function code corresponding to the first function in the first table and identify a target address corresponding to the identified function code. Thereafter, the first switch 310 may identify a communication node indicated by the identified target address, and determine the identified second end node 312 as a communication node performing the second function corresponding to the first function. Thereafter, the first switch 310 may identify a MAC address of the second end node 312, which is determined based on the first table, in the second table, and identify that a port corresponding to the MAC address of the identified second end node 312 is the second port 310-2. Thereafter, the first switch 310 may configure the identified second port 310-2 as the target port of mirroring for the first function.

Then, the first communication node may configure at least one port connecting between the first communication node and the at least one communication node as at least one mirroring port of the mirroring for the first function (S442). Specifically, the first communication node may identify at least one port of the at least one communication nodes among the plurality of ports included in the first communication node based on the second table. Then, the first communication node may configure the at least one port of the identified at least one communication node as the mirroring port of the mirroring for the first function.

For example, if the first communication node is the first switch 310 shown in FIG. 3, the at least one communication node may be the third end node 313 and the fourth end node 314 connected to the first switch 310. In this case, the first switch 310 may identify a function code corresponding to the first function in the first table, and identify a VLAN ID corresponding to the identified function code. Then, the first switch 310 may identify a communication node having the same VLAN ID as the VLAN ID identified in the second table. That is, the first switch 310 may identify the second end node 312, the third end node 313, and the fourth end node 314 having the same VLAN ID as the VLAN ID corresponding to the function code of the first function in the second table. Here, among the second end node 312, the third end node 313, and the fourth end node 314, the first switch 310 may configure the ports for the third end node 313 and the fourth end node 344, excluding the second end node 312 whose MAC address is the target address, as the mirroring port of the mirroring for the first function. That is, among the ports 310-1, 310-2, 310-3, and 310-4 which are included in the first switch 310, the first switch 310 may configure the third port 310-3 and the fourth port 310-4 which are connected to the third end node 313 and the fourth end node 314 as the mirroring port of the mirroring for the first function.

Referring again to FIG. 4, if the second message is received from the at least one communication node via the mirroring port, the first communication node may transmit the second message to the third communication node through the target port (S450). Here, the second message may include data related to the second function. For example, if the second function is the function of outputting images photographed at the rear of the vehicle, the second message may include data of the images photographed at the rear of the vehicle, which are data related to the second function.

Also, if the first communication node is the first switch 310 shown in FIG. 3, the at least one communication node may be the third end node 313 and the fourth end node 314 which are connected to the first switch 310. In such the case, the third end node 313 and the fourth end node 314 may generate the second message including data related to the second function. The third end node 313 and the fourth end node 314 may then transmit the generated second message to the first switch 310.

Specifically, the third end node 313 may generate the second message including data related to the second function, and transmit the generated second message to the first switch 310 through the first port 313-1. Then, the first switch 310 may receive the second message from the third end node 313 via the first port 310-3 connected to the first port 313-1 of the third end node 313. Also, the fourth end node 314 may generate the second message including data related to the second function and transmit the generated second message to the first switch 310 via the first port 314-1. Then, the first switch 310 may receive the second message from the fourth end node 314 via the fourth port 310-4 connected to the first port 313-1 of the third end node 313.

Then, the first switch 310 may confirm that the second message from the third end node 313 and the fourth end node 314 from the third port 310-3 and the fourth port 310-4 which are mirroring ports for mirroring of the first function). Then, the first switch 310 may transmit the second message to the second end node 312 via the second port 310-2 which is the target port for mirroring of the first function. The second end node 312 may then receive the second message from the first switch 310 via the first port 312-1 connected to the second port 310-2 of the first switch 310. The second end node 312 may then process the received second message. For example, if the second end node 312 is a display device capable of outputting images, and the image data is included in the second message, the second end node 312 may output the image data included in the second message.

As described above with reference to FIGS. 3 to 7, the first communication node performing an operation method for mirroring in a vehicle network according to an embodiment of the present disclosure may configure port mirroring for the first function is. A specific method of processing the message at the first communication node based on the port mirroring will be described in detail below with reference to FIG. 8.

Figure 8:
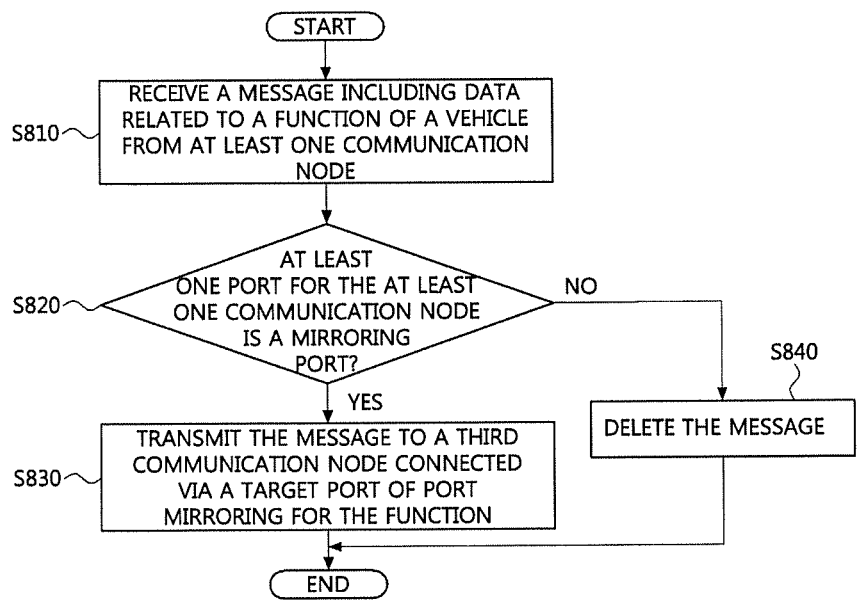
FIG. 8 is a flowchart for explaining an operation method of a communication node for mirroring in a vehicle network according to another embodiment of the present disclosure.

FIG. 8 is a flowchart for explaining an operation method of a communication node for mirroring in a vehicle network according to another embodiment of the present disclosure.

Referring to FIG. 8, an operation method of a communication node for mirroring in a vehicle network according to an embodiment of the present disclosure may be performed in the first communication node. The first communication node may refer to the switch 310 described with reference to FIGS. 1 and 3, and may have a structure similar or identical to that of the communication node described with reference to FIG. 2. A vehicle network according to an embodiment of the present disclosure may include a plurality of communication nodes. Here, the plurality of communication nodes included in the vehicle network may include the end nodes 311, 312, 313, and 314 connected to the switch 310 and the switch 310 described with reference to FIG. 3.

At least one communication node among the plurality of communication nodes included in the vehicle network may generate a message including data related to a function of the vehicle. Then, the at least one communication node may transmit the generated message to the first communication node. Then, the first communication node may receive the message including data related to the function of the vehicle from the at least one communication node (S810). Here, the at least one communication node may be at least end node connected to the first communication node, and may perform at least one of a plurality of functions performed in the vehicle.

Then, the first communication node may identify the data related to the function of the vehicle included in the received message, and determine whether port mirroring is configured for the identified function. Specifically, the first communication node may check whether a port for the at least communication node among a plurality of ports included in the first communication node is a mirroring port (S820). That is, the first communication node may check whether the port connected to the at least one communication node among the plurality of ports included in the first communication node is a port configured as a mirroring port.

Then, the first communication node may determine that port mirroring for the identified function has been configured when the port connecting between the first communication node and the at least one communication node is a mirroring port for mirroring the identified function. On the other hand, if the port connecting the first communication node and the at least one communication node is not a mirroring port for mirroring the identified function, the first communication node may determine that port mirroring for the confirmed function has not been configured.

Then, the first communication node may process the message based on whether or not port mirroring has been configured for the identified function. Specifically, if the port mirroring for the identified function is configured, the first communication node may transmit a message including data related to the function of the vehicle to a third communication node via a target port for the identified function (S830). Here, the third communication node may refer to a communication node connected through the target port for the port mirroring among the plurality of ports included in the first communication node. On the other hand, if the port mirroring for the identified function is not configured, the first communication node may delete the message including the data related to the function of the vehicle (S840).

Through the above-described method, the first communication node performing an operation method of a communication node for mirroring in a vehicle network according to an embodiment of the present invention may process messages related to a function for which the port mirroring has been configured. Specifically, a method for processing a message related to the function based on the port mirroring at the first communication node will be described below.

For example, as described with reference to FIG. 2, the first communication node may include a PHY layer and a controller. The first communication node may receive the message including data related to the function of the vehicle from the at least one communication node through the PHY layer. The message received via the PHY layer of the first communication node may then be transmitted to a PHY layer of the third communication node connected via the target port for the port mirroring, without being forwarded to the controller. That is, when the first communication node receives the message including the data related to the function of the vehicle for which the port mirroring is configured through the PHY layer, the first communication node may directly transmit the message to the PHY layer of the third communication node connected through the target port of the port mirroring without intervention of the controller.

Figure 9:
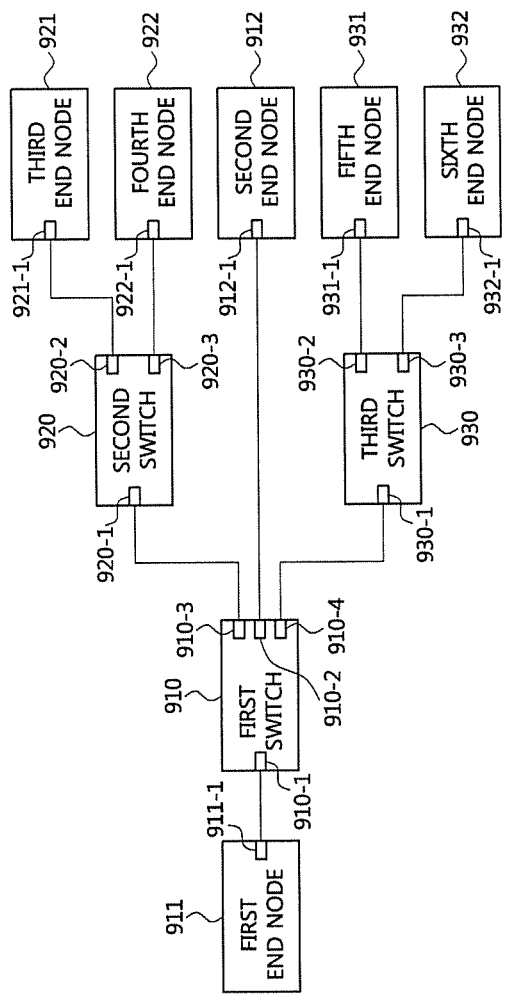
FIG. 9 is a block diagram for explaining an operation method of a communication node for mirroring in a vehicle network according to another embodiment of the present disclosure.

FIG. 9 is a block diagram for explaining an operation method of a communication node for mirroring in a vehicle network according to another embodiment of the present disclosure.

Referring to FIG. 9, a vehicle network may comprise a first switch 910, a second switch 920, a third switch 930, a first end node 011, a second end node 912, a third end node 921, a fourth end node 922, a fifth end node 931, a sixth end node 932, and the like. The switches 910, 920, and 930 may perform the same or similar functions as the switch shown in FIG. 1 and the end nodes 911, 912, 921, 922, 931, and 932 may perform the same or similar functions as the end node illustrated in FIG. 1. The switches 910, 920, and 930 and the end nodes 911, 912, 921, 922, 931, and 932, respectively, may be configured the same or similar to the communication node shown in FIG. 2.

The first switch 310 may include a plurality of ports 910-1, 910-2, 910-3, and 910-4. The first port 910-1 of the first switch 310 may be coupled to a first port 911-1 of the first end node 911, and a link may be formed between the first port 910-1 of the first switch 310 and the first port 911-1 of the first end node 911. The second port 910-2 of the first switch 310 may be coupled to a first port 912-1 of the second end node 912, and a link may be formed between the second port 910-2 of the first switch 910 and the first port 912-1 of the second end node 912. The third port 910-3 of the first switch 910 may be coupled to a first port 920-1 of the second switch 920, and a link may be formed between the third port 910-3 of the first switch 910 and the first port 920-1 of the second switch 920. The fourth port 910-4 of the first switch 910 may be coupled to a first port 930-1 of the third switch 930, and a link may be formed between the fourth port 910-4 of the first switch 910 and the first port 930-1 of the third switch 930.

The second switch 920 may include a plurality of ports 920-1, 920-2, and 910-3. The first port 920-1 of the second switch 920 may be coupled to a first port 910-1 of the first switch 910, and a link may be formed between the first port 920-1 of the second switch 920 and the second port 910-2 of the first switch 910. The second port 920-2 of the second switch 920 may be coupled to a first port 921-1 of the third end node 921, and a link may be formed between the second port 920-2 of the second switch 920 and the first port 921-1 of the third end node 921. The third port 920-3 of the second switch 920 may be coupled to a first port 922-1 of the fourth end node 920, and a link may be formed between the third port 920-3 of the second switch 920 and the first port 922-1 of the fourth switch 922.

The third switch 930 may include a plurality of ports 930-1, 930-2, and 930-3. The first port 930-1 of the third switch 930 may be coupled to the fourth port 910-4 of the first switch 910, and a link may be formed between the first port 930-1 of the third switch 930 and the fourth port 910-4 of the first switch 910. The second port 930-2 of the third switch 930 may be coupled to a first port 931-1 of the fifth end node 931, and a link may be formed between the second port 930-2 of the third switch 930 and the first port 931-1 of the fifth end node 931. The third port 930-3 of the third switch 930 may be coupled to a first port 932-1 of the sixth end node 932, and a link may be formed between the third port 930-3 of the third switch 930 and the first port 932-1 of the sixth end node 932.

In the vehicle network having the connection structure as described above, the first switch 910 may perform the operation method described with reference to FIGS. 4 to 7 or the operation method described with reference to FIG. 8. That is, the first switch 910 may perform the respective steps included in the operation methods described with reference to FIGS. 4 to 8. However, when a plurality of switches are included in the vehicle network as shown in FIG. 9, there may be a difference in the operation method performed in the first switch 910, which will be specifically described below.

The first switch 910 may receive a first message indicating an operation of a first function among a plurality of functions performed in a vehicle from the first end node 911 via the first port 910-1. Then, the first switch 910 may identify a first function indicated by the first message, and a function code corresponding to the identified first function in a first table (for example, the first table described with reference to FIG. 5). Then, the first switch 910 may identify a target address corresponding to the function code of the first function in the first table. Then, the first switch 910 may determine that the second end node 912, which is a communication node indicated by the target address, is a communication node that performs a second function corresponding to the first function.

Then, the first switch 910 may identify a VLAN ID corresponding to the function code of the first function based on the first table, and identify the third end node 921, the fourth end node 922, the fifth end node 931, and the six end node 932 which have same VLAN ID as the VLAN ID corresponding to the function code of the first function based on the first table. Thereafter, the first switch 910 may determine that the identified end nodes 921, 922, 931, 932 are communication nodes providing data related to the second function.

At this time, the first switch 910 may identify MAC addresses of the third end node 921 and the fourth end node 922 based on a second table, and determine that the third end node 921 and the fourth end node 922 are connected to the second switch 920 based on the identified MAC addresses. Also, the first switch 910 may identify that the third port 910-3 is connected to the second switch 920. Then, the first switch 910 may generate a message including an indicator instructing mirroring for the first function, and transmit the generated message to the second switch 920 via the third port 910-3.

Then, the second switch 920 may receive the message including the indicator instructing the mirroring for the first function from the first switch 910 via the first port 920-1. Subsequently, the second switch 920 may identify the first function based on the received message, and configure the port mirroring for the identified first function. The specific method of configuring the port mirroring for the first function at the second switch 920 may be the same as that described with reference to FIGS. 4 to 7. For example, the first port 920-1, which is connected to the first switch 910, among the plurality of ports 920-1, 920-2, and 920-3 included in the second switch 920, may be configured as a target port of the mirroring for the first function, and the second port 920-2 connected to the third end node 921 and the third port 920-3 connected to the fourth end node 922 may be configured as mirroring ports of the mirroring for the first function. Accordingly, upon receiving messages including data related to the second function corresponding to the first function from the third end node 921 and the fourth end node 922, the second switch 920 may transmit the received messages to the first switch 910 via the first port 920-1 configured as the target port.

In the same way, the first switch 910 may instruct the fifth end node 931 and the sixth end node 932 connected through the third switch 930 to perform mirroring for the first function. Then, upon receiving messages including data related to the second function corresponding to the first function from the fifth end node 931 and the sixth end node 932, the third switch 930 may transmit the received messages to the first switch 910.

Meanwhile, the first switch 910 may identify a port corresponding to the MAC address of the second end node 912 based on the second table, and configure the identified port as the target port of mirroring for the first function. That is, the first switch 910 may identify that the port connecting the first switch 910 and the second end node 912 is the second port 910-2 based on the second table, and configure the identified second port 910-2 as the target port of the mirroring for the first function.

Then, the first switch 910 may configure the third port 910-3 connected to the second switch 920 and the fourth port 910-4 connected to the third switch 930 as mirroring ports of the mirroring for the first function. Then, upon receiving messages including data related to the second function corresponding to the first function from the second switch 920 and the third switch 930, the first switch 910 may transmit the received messages to the second end node 912 via the second port 910-2 configured as the target port of the mirroring for the first function.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node among a plurality of communication nodes included in an Ethernet-based vehicle network, comprising:
receiving a first message indicating an operation of a first function of a vehicle from a second communication node among the plurality of communication nodes;
determining a third communication node performing a second function corresponding to the first function among the plurality of communication nodes based on a first table including function codes of a plurality of functions performed at the vehicle;
determining at least one communication node providing data related to the second function among the plurality of communication nodes; and
configuring port mirroring for the first function such that a second message received from the at least one communication node is mirrored to the third communication node,
wherein the determining a third communication node comprises:
identifying a target address corresponding to a function code of the first function based on the first table.

2. The operation method according to claim 1, wherein the third communication node is determined based on the first table which further includes target addresses corresponding to the respective function codes, and virtual local area network (VLAN) identifiers corresponding to the respective function codes.

3. The operation method according to claim 2, wherein the determining a third communication node further comprises:
determining a communication node indicated by the identified target address as the third communication node performing the second function corresponding to the first function.

4. The operation method according to claim 2, wherein the at least one communication node is determined based on a second table including port numbers of a plurality of ports included in the first communication node, media access control (MAC) addresses of communication nodes connected through the plurality of ports, and VLAN identifiers of the communication nodes connected through the plurality of ports.

5. The operation method according to claim 4, wherein the determining at least one communication node further comprises:
identifying at least one port having a VLAN identifier identical to a VLAN identifier corresponding to the function code of the first function based on the second table; and
determining at least communication node connected through the identified at least one port as the at least one communication node providing data related to the second function.

6. The operation method according to claim 1, wherein the configuring port mirroring further comprises:
configuring a port connecting between the first communication node and the third communication node as a target port of mirroring for the first function; and
configuring at least one port connecting the first communication node and the at least one communication node as at least one mirroring port of mirroring for the first function.

7. The operation method according to claim 6, further comprising transmitting a second message to the third communication node through the target port when the second message is received from the at least one communication node through the at least one mirroring port.

8. The operation method according to claim 1, wherein the first communication node is a switch included in the Ethernet-based vehicle network, and the second communication node, the third communication node, and the at least one communication node are end nodes connected to the first communication node.

9. A first communication node in an Ethernet-based vehicle network comprising a processor and a memory storing at least one instruction executed by the processor, wherein the at least one instruction is configured to:
receive a first message indicating an operation of a first function of a vehicle from a second communication node among a plurality of communication nodes;
determine a third communication node performing a second function corresponding to the first function among the plurality of communication nodes based on a first table including function codes of a plurality of functions performed at the vehicle, and to identify at least one port having a VLAN identifier identical to a VLAN identifier corresponding to a function code of the first function based on the second table;
determine at least one communication node providing data related to the second function among the plurality of communication nodes based on a second table including VLAN identifiers of the plurality of communication nodes connected through a plurality of ports included in the first communication node;
configure port mirroring for the first function such that a second message received from the at least one communication node is mirrored to the third communication node; and
upon receiving the second message from the at least one communication node, transmit the second message to the third communication node based on the configured port mirroring.

10. The first communication node according to claim 9, wherein the at least one instruction is further configured to determine the third communication node based on the first table which further includes target addresses corresponding to the respective function codes, and virtual local area network (VLAN) identifiers corresponding to the respective function codes.

11. The first communication node according to claim 10, wherein the at least one instruction is further configured to identify a target address corresponding to a function code of the first function based on the first table, and determine a communication node indicated by the identified target address as the third communication node performing the second function corresponding to the first function.

12. The first communication node according to claim 10, wherein the at least one instruction is further configured to determine the at least one communication node based on a second table including port numbers of the plurality of ports included in the first communication node, and media access control (MAC) addresses of communication nodes connected through the plurality of ports.

13. The first communication node according to claim 12, wherein the at least one instruction is further configured to determine at least one communication node connected through the identified at least one port as the at least one communication node providing data related to the second function.

14. The first communication node according to claim 9, wherein the at least one instruction is further configured to configure a port connecting between the first communication node and the third communication node as a target port of mirroring for the first function, and configure at least one port connecting the first communication node and the at least one communication node as at least one mirroring port of mirroring for the first function.

* * * * *